United States Patent
Lin et al.

(10) Patent No.: US 10,921,677 B2
(45) Date of Patent: Feb. 16, 2021

(54) FLEXIBLE ELECTRONIC DEVICE

(71) Applicant: E Ink Holdings Inc., Hsinchu (TW)

(72) Inventors: Yi-Sheng Lin, Hsinchu (TW);
Chia-Chun Yeh, Hsinchu (TW);
Kuo-Hsing Cheng, Hsinchu (TW);
Hsing-Kai Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 154 days.

(21) Appl. No.: 16/171,360

(22) Filed: Oct. 25, 2018

(65) Prior Publication Data

US 2019/0129271 A1    May 2, 2019

(30) Foreign Application Priority Data

Oct. 26, 2017 (CN) ............ 2017 1 1016742

(51) Int. Cl.
| G02B 26/00 | (2006.01) |
| G02F 1/167 | (2019.01) |
| G02F 1/1333 | (2006.01) |
| G02F 1/1679 | (2019.01) |

(52) U.S. Cl.
CPC .......... *G02F 1/167* (2013.01); *G02B 26/005* (2013.01); *G02F 1/133305* (2013.01); *G02F 1/1679* (2019.01); *G02F 2201/50* (2013.01); *G02F 2202/28* (2013.01)

(58) Field of Classification Search
CPC .. G02F 1/167; G02F 1/1679; G02F 1/133305; G02F 2201/50; G02F 2202/28; G02B 26/005
USPC ......... 359/245, 265, 290, 291, 296; 345/107
See application file for complete search history.

(56) References Cited

U.S. PATENT DOCUMENTS

| 8,115,326 B2 | 2/2012 | Aitken et al. |
| 8,215,041 B2 | 7/2012 | Hill |
| 2006/0028128 A1 | 2/2006 | Ohkubo |
| 2006/0132025 A1 | 6/2006 | Gao et al. |
| 2009/0261062 A1 | 10/2009 | Kim |

(Continued)

FOREIGN PATENT DOCUMENTS

| CN | 104241316 | 12/2014 |
| CN | 104701349 | 6/2015 |

(Continued)

OTHER PUBLICATIONS

"Office Action of China Counterpart Application", dated Aug. 26, 2020, p. 1-p. 11.

*Primary Examiner* — William Choi
(74) *Attorney, Agent, or Firm* — JCIPRNET (57) ABSTRACT

A flexible electronic device has a display region and a package region surrounding the display region. The flexible electronic device includes a substrate, a first protection film, a first adhesive layer, a display medium layer, and a flexible auxiliary layer. The first protection film is disposed to be opposite to the substrate. The first adhesive layer is disposed between the substrate and the first protection film, and at least located within the package region. The display medium layer is disposed between the substrate and the first protection film, and located within the display region. The flexible auxiliary layer is disposed on a surface of the first protection film, and located within the package region, wherein the flexible auxiliary layer overlaps the first adhesive layer in a thickness direction.

18 Claims, 6 Drawing Sheets

(56) References Cited

U.S. PATENT DOCUMENTS

2015/0179722 A1    6/2015  Koo et al.
2016/0113106 A1*   4/2016  Kim ...................... G02F 1/1333
                                                            361/749
2016/0143130 A1    5/2016  Wu et al.

FOREIGN PATENT DOCUMENTS

| CN | 105845700 | 8/2016 |
| CN | 106505156 | 3/2017 |
| CN | 106710449 | 5/2017 |
| CN | 106816530 | 6/2017 |
| CN | 107134538 | 9/2017 |
| KR | 101473312 | 12/2014 |
| TW | 201432525 | 8/2014 |

* cited by examiner

FLEXIBLE ELECTRONIC DEVICE

CROSS-REFERENCE TO RELATED APPLICATION

This application claims the priority benefit of China application serial no. 201711016742.3, filed on Oct. 26, 2017. The entirety of the above-mentioned patent application is hereby incorporated by reference herein and made a part of this specification.

BACKGROUND OF THE INVENTION

Field of the Invention

The invention relates to an electronic device, and more particularly relates to a flexible electronic device.

Description of Related Art

In recent years, portable electronic devices have become very popular and common. In order to meet the users' demand for portability of portable electronic devices, flexible electronic devices have been proposed. In terms of the existing technology, the flexible electronic devices currently available on the market are still manufactured with use of an adhesive material, for example, by a packaging process for bonding between the driving substrate and the upper protection cover.

If the flexible electronic device has a display medium in the display region, and the upper protection cover and the driving substrate are bonded to each other in the package region by rolling, pressing, or other types of layered bonding, the driving substrate and the upper protection cover would have different distances therebetween in the package region and the display region. In such a case, the adhesive material that bonds the driving substrate and the upper protection cover in the package region may suffer an additional stress along the inclination of the stepped portion between the two regions. After the flexible electronic device is bent repeatedly over a long period of time, the additional stress along the inclination of the stepped portion and the bending stress caused by bending will both accelerate creep of the adhesive material, which may cause the adhesive material to peel off and result in separation of the driving substrate and the upper protection cover.

SUMMARY OF THE INVENTION

The invention provides a flexible electronic device, which effectively prevents an adhesive layer between protection film and the substrate from peeling off.

A flexible electronic device in an embodiment of the invention has a display region and a package region surrounding the display region. The flexible electronic device includes a substrate, a first protection film, a first adhesive layer, a display medium layer, and a flexible auxiliary layer. The first protection film is disposed to be opposite to the substrate. The first adhesive layer is disposed between the substrate and the first protection film, and is at least located within the package region. The display medium layer is disposed between the substrate and the first protection film, and is located within the display region. The flexible auxiliary layer is disposed on a surface of the first protection film and is located within the package region, wherein the flexible auxiliary layer overlaps the first adhesive layer in a thickness direction.

In an embodiment of the invention, the first protection film is bonded to the substrate via the first adhesive layer.

In an embodiment of the invention, a first distance exists between the substrate and the first protection film in the package region, and a second distance exists between the substrate and the first protection film in the display region, and the first distance is smaller than the second distance.

In an embodiment of the invention, the first protection film is located between the flexible auxiliary layer and the substrate.

In an embodiment of the invention, when the flexible electronic device is in a bent state, a bent section of the flexible electronic device has a compressive stress zone, a tensile stress zone, and a neutral axis plane between the compressive stress zone and the tensile stress zone, and the first adhesive layer in the bent section is located in the tensile stress zone or on the neutral axis plane.

In an embodiment of the invention, the flexible auxiliary layer is located between the first protection film and the substrate.

In an embodiment of the invention, a first distance exists between the substrate and the first protection film in the package region, and a second distance exists between the substrate and the first protection film in the display region, and the first distance and the second distance are equal.

In an embodiment of the invention, the flexible auxiliary layer and the first adhesive layer both surround the display region.

In an embodiment of the invention, the flexible auxiliary layer includes two auxiliary patterns opposite to each other, and the two auxiliary patterns are respectively disposed on two opposite sides of the flexible electronic device, and each of the two auxiliary patterns extends along the corresponding side to define a predetermined bent section of the flexible electronic device.

In an embodiment of the invention, a length of each of the two auxiliary patterns is smaller than a length of the corresponding side.

In an embodiment of the invention, a Young's modulus of the flexible auxiliary layer is greater than 1500 MPa.

In an embodiment of the invention, the flexible auxiliary layer includes a second adhesive layer and a flexible material layer, and the second adhesive layer is located between the flexible material layer and the first protection film, and the flexible material layer is bonded to the first protection film via the second adhesive layer.

In an embodiment of the invention, the flexible electronic device further includes a second protection film. The substrate is disposed between the first protection film and the second protection film.

In an embodiment of the invention, the flexible auxiliary layer surrounds the display region, and the first adhesive layer extends continuously in the package region and the display region.

A flexible electronic device in an embodiment of the invention has a display region and a package region surrounding the display region. The flexible electronic device includes a substrate, a first protection film, a first adhesive layer, and a display medium layer. The first protection film is disposed opposite to the substrate, and the first protection film has a first thickness in the package region and a second thickness in the display region, and the first thickness is greater than the second thickness. The first adhesive layer is disposed between the substrate and the first protection film, and is at least located within the package region. The display medium layer is disposed between the substrate and the first protection film, and is located within the display region.

In an embodiment of the invention, the first protection film is bonded to the substrate via the first adhesive layer.

In an embodiment of the invention, a first distance exists between the substrate and the first protection film in the package region, and a second distance exists between the substrate and the first protection film in the display region, and the first distance is smaller than the second distance.

In an embodiment of the invention, a total of the first distance and the first thickness is equal to a total of the second distance and the second thickness.

In an embodiment of the invention, the flexible electronic device further includes a second protection film. The substrate is disposed between the first protection film and the second protection film.

Based on the above, the flexible electronic device in one or some embodiments of the invention includes the flexible auxiliary layer located in the package region. Thus, peeling-off of the first adhesive layer between the substrate and the first protection film in the package region is effectively prevented to avoid separation of the substrate and the first protection film, and occurrence of creep of the first adhesive layer is deferred, such that the flexible electronic device has a long service life.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
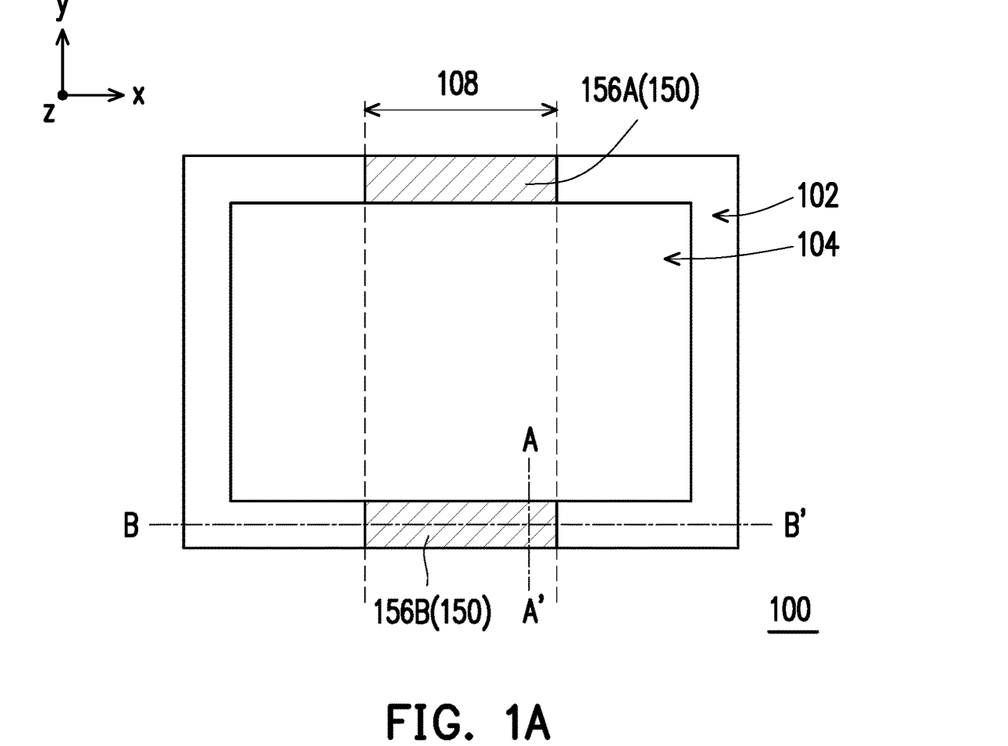
FIG. 1A is a schematic top view of a flexible electronic device according to an embodiment of the invention.
Figure 1B:
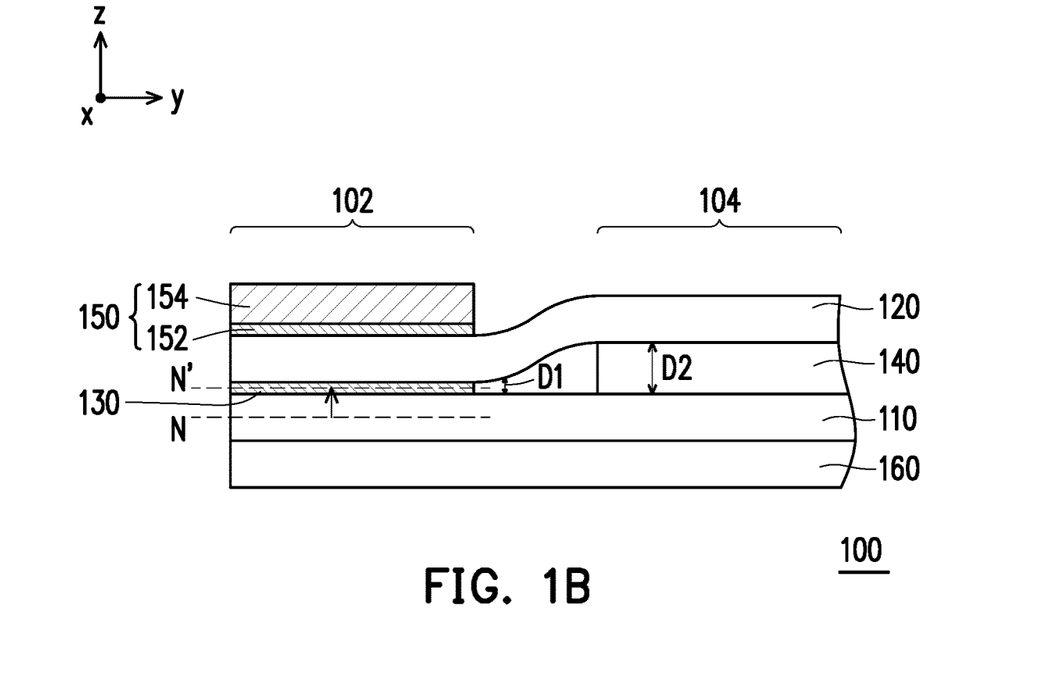
FIG. 1B is a schematic cross-sectional view of the flexible electronic device of FIG. 1A along the line A-A'.
Figure 1C:
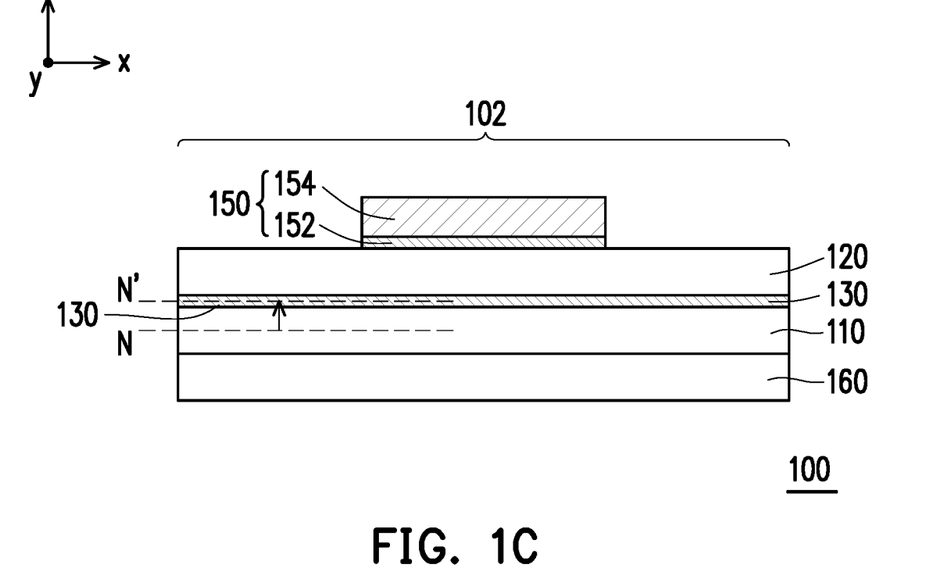
FIG. 1C is a schematic cross-sectional view of the flexible electronic device of FIG. 1A along the line B-B'.
Figure 1D:
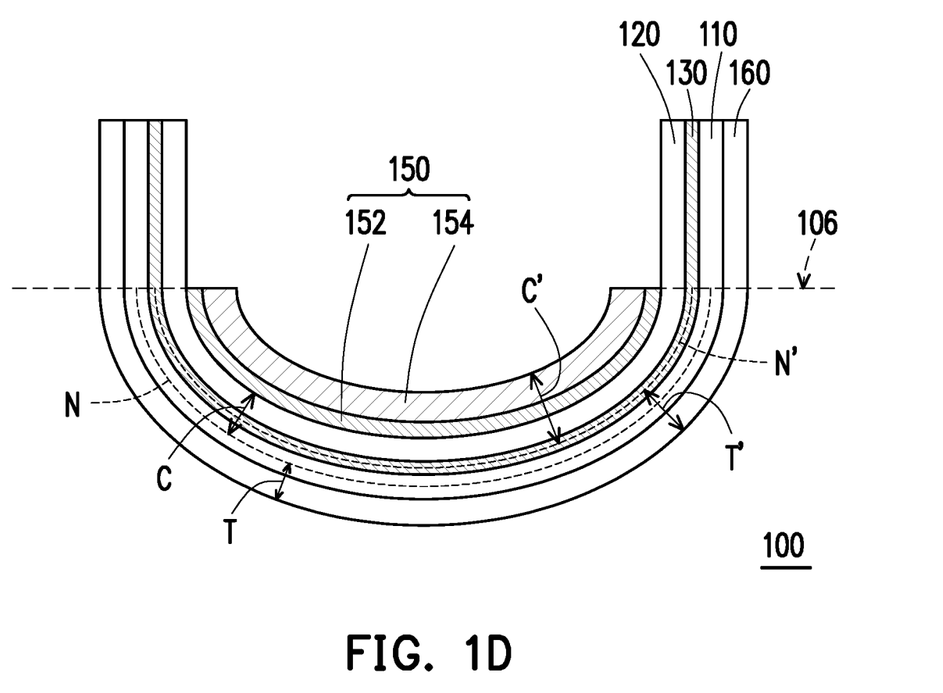
FIG. 1D is a schematic view of the flexible electronic device of FIG. 1C in a bent state.

FIG. 1A is a schematic top view of a flexible electronic device according to an embodiment of the invention. FIG. 1B is a schematic cross-sectional view of the flexible electronic device of FIG. 1A along the line A-A'. FIG. 1C is a schematic cross-sectional view of the flexible electronic device of FIG. 1A along the line B-B'. FIG. 1D is a schematic cross-sectional view of the flexible electronic device of FIG. 1C in a bent state. Referring to FIG. 1A and FIG. 1B, the flexible electronic device 100 has a display region 104 and a package region 102 surrounding the display region 104. The flexible electronic device 100 includes a substrate 110, a first protection film 120, a first adhesive layer 130, a display medium layer 140, and a flexible auxiliary layer 150. The first protection film 120 is disposed to be opposite to the substrate 110. The first adhesive layer 130 is disposed between the substrate 110 and the first protection film 120 and is at least located within the package region 102. The display medium layer 140 is disposed between the substrate 110 and the first protection film 120 and is located within the display region 104. The flexible auxiliary layer 150 is disposed on a surface of the first protection film 120 and is located within the package region 102, wherein the flexible auxiliary layer 150 overlaps the first adhesive layer 130 in a thickness direction. Here, the flexible electronic device 100 is an electronic device such as an electronic paper display, for example. Nevertheless, the invention is not intended to limit the flexible electronic device 100 to a certain type.

Specifically, the substrate 110 is a thin film driving substrate composed of a material that includes flexible plastic or metal, for example, so as to make the flexible electronic device 100 lighter, thinner, and more portable. The plastic includes a flexible plastic material, such as polyimide (PI), polyethylene terephthalate (PET), or polyethylene naphthalate (PEN), so as to prevent the flexible electronic device 100 from damaging internal electronic components caused by collision or falling, and greatly reduce the weight of the flexible electronic device 100. The thin film driving substrate includes an active array substrate such as a thin film transistor (TFT) array substrate, a passive array substrate, or other substrates with a working circuit, but not limited thereto. For example, the substrate 110 of the flexible electronic device 100 of this embodiment may be a TFT driving substrate having a support based composed of a PI material, for example, for electrically driving the display medium layer 140 attached thereon to achieve the function of displaying images.

The first protection film 120 may be a protection cover for improving durability of the flexible electronic device 100 and protecting soft components, such as the substrate 110 or the display medium layer 140, of the flexible electronic device 100 from being scratched, such that the flexible electronic device 100 is more portable or suitable to be worn for conditions where the flexible electronic device 100 may be dynamically bent or deformed when used. The first protection film 120 may be laminated onto the substrate 110 by thermal bonding, vacuum lamination, roller lamination, or glue lamination. A material of the first protection film 120 is polyethylene terephthalate (PET), for example, but not limited thereto.

The first adhesive layer 130 may be an adhesive material, such as optical clear resin (OCR), optical clear adhesive (OCA), or UV glue, which has good workability, adhesive strength, and transmittance. Here, the first adhesive layer 130 may be used like a sealant to bond between the substrate 110 and the first protection film 120. The first adhesive layer 130 may be attached to the first protection film 120 in advance in the process of preparing the first protection film 120, and then the first protection film 120 with the first adhesive layer 130 is bonded to the substrate 110. Nevertheless, the invention is not limited thereto. The scope of the invention covers any case where two flexible substrates are bonded by an adhesive material or an adhesive layer.

The display medium layer 140 may be an electrophoretic display film or an electrowetting film, and the display medium layer 140 is disposed between the substrate 110 and the first protection film 120 and may be driven by the driving components formed on the substrate 110 to display images and be protected by the first protection film 120. That is, the first protection film 120 may be embodied as the protection cover of the flexible electronic device 100 on a light emitting surface, such that the flexible electronic device 100 is strong and durable. Thereby, the overall configuration of the flexible electronic device 100 is basically completed.

Referring to FIG. 1B, the first protection film 120 is bonded to the substrate 110 in the package region 102 via the first adhesive layer 130, such that a first distance D1 exists between the substrate 110 and the first protection film 120 in the package region 102. That is, the first distance D1 may be a thickness of the first adhesive layer 130 in the Z-axis direction. The display medium layer 140 is disposed between the substrate 110 and the first protection film 120 in the display region 104, such that a second distance D2 exists between the substrate 110 and the first protection film 120 in the display region 104. In other words, the second distance D2 may be a thickness of the display medium layer 140 in the Z-axis direction.

Specifically, when the first distance D1 is smaller than the second distance D2, since the first protection film 120 is bonded and packaged with the substrate 110, the first protection film 120 forms an inclined surface that is inclined from the display region 104 to the package region 102. As a result, the flexible electronic device 100 is a package product that has an approximately trapezoidal structure. A slope of the inclined surface changes according to the heights of the display medium layer 140 and the first adhesive layer 130 and the lateral distance therebetween. Then, the first adhesive layer 130 that bonds between the first protection film 120 and the substrate 110 receives an additional stress along the inclined surface direction here. In this case, when the flexible electronic device 100 is bent, the stress concentrates on the bent portion that has been folded or flexed during assembly. Thus, the first adhesive layer 130 suffers multi-axial stresses here, which results in stress interference, stress creep, or local deformation and accelerate occurrence of creep on the first adhesive layer 130, and eventually cause the substrate 110, the first adhesive layer 130, and the first protection film 120 to peel off and damage.

More specifically, referring to FIG. 1B, FIG. 1C, and FIG. 1D, when the flexible electronic device 100 is bent, the bending axis is parallel to the Y-axis direction, for example, and the first protection film 120 and the first adhesive layer 130 are located on the inner side of the bent flexible electronic device 100 with respect to the substrate 110. At this time, the first adhesive layer 130 and the first protection film 120 in the package region 102 within a bent section 106 suffer both the stress in the inclined surface direction, as shown in FIG. 1B, and the bending stress of the bent state, as shown in FIG. 1D.

Due to the bending stress, the bent section 106 of the flexible electronic device 100 has a compressive stress zone C, a tensile stress zone T, and a neutral axis plane N between the compressive stress zone C and the tensile stress zone T. Generally speaking, when the first adhesive layer 130 and the first protection film 120 in the bent section 106 are within the compressive stress zone C, usually the first protection film 120 generates a force in the Z-axis direction relatively away from the first adhesive layer 130 to be separated from the first adhesive layer 130, so as to release the bending stress applied thereon. Meanwhile, the first adhesive layer 130 suffers the compressive stress in the X-axis direction and the tensile stress in the Z-axis direction generated by the flexible electronic device 100 in the bent state, and thus may be easily damaged when the received stresses exceed the flexibility limit or cohesive force and adhesive force limits thereof, which may cause creep in the first adhesive layer 130 and cause the first adhesive layer 130 to peel off from the substrate 110 and/or the first protection film 120 and result in separation from the substrate 110 and/or the first protection film 120. In other words, in this embodiment, when the flexible electronic device 100 is bent, the first adhesive layer 130 in the bent section 106 receives both the compressive stress in the X-axis direction and the tensile stress in the Z-axis direction, as shown in FIG. 1D, and the tensile stress in the YZ direction, as shown in FIG. 1B, which accelerates the occurrence of creep. Moreover, in order to improve the flexibility of the flexible electronic device 100, usually a softer adhesive material is used to form the adhesive layer that bonds between the substrate and the first protection film. However, such a material tends to have a poor cohesive force and thus is not suitable to be disposed in the region of the compressive stress zone C under the bending stress. Therefore, if the position of the neutral axis plane N is moved toward the side of the first protection film 120 and the first adhesive layer 130 such that the first adhesive layer 130 is located near the neutral axis plane N or in the tensile stress zone T in the bent state, creep damage of the first adhesive layer 130 may be deferred.

Specifically, in FIG. 1B to FIG. 1D, the compressive stress zone C, the tensile stress zone T, and the neutral axis plane N between the compressive stress zone C and the tensile stress zone T represent a state where a flexible electronic device without the flexible auxiliary layer 150 is bent, for example; and the compressive stress zone C', the tensile stress zone T', and the neutral axis plane N' between the compressive stress zone C' and the tensile stress zone T' represent a state where the flexible electronic device 100 with the flexible auxiliary layer 150 is bent, for example. As shown in FIG. 1B to FIG. 1D, in this embodiment, the flexible auxiliary layer 150 is attached to the first protection film 120 in the package region 102. Therefore, the neutral axis plane N' of the flexible electronic device 100 may be shifted toward the side of the flexible auxiliary layer 150, as compared with the flexible electronic device without the flexible auxiliary layer 150. That is, when the flexible electronic device 100 is in the bent state as shown in FIG. 1D, the position of the first adhesive layer 130 for bonding the substrate 110 and the first protection film 120 may be away from the region of the compressive stress zone C' to reduce the stress on the first adhesive layer 130. Accordingly, occurrence of creep of the first adhesive layer 130 accelerated by multi-axial stresses, such as the tensile stress in the inclined surface direction and the bending stress in the bent state, may be effectively prevented to reduce the possibility of damaging components.

More specifically, referring to FIG. 1B and FIG. 1D, the flexible auxiliary layer 150 of this embodiment is disposed on the outer surface of the first protection film 120. That is, the first protection film 120 is located between the flexible auxiliary layer 150 and the substrate 110. Specifically, the flexible auxiliary layer 150 of this embodiment may be disposed only in the package region 102 corresponding to the first adhesive layer 130, such that an orthographic projection area of the flexible auxiliary layer 150 on the substrate 110 approximately falls in an orthographic projection area of the first adhesive layer 130 on the substrate 110. Nevertheless, the invention is not limited thereto. In alternative embodiments, the flexible auxiliary layer 150 may be disposed between the substrate 110 and the first protection film 120. In alternative embodiments not shown here, the flexible auxiliary layer may be disposed only corresponding to one side of the first adhesive layer close to the inclined surface, so as to prevent creep and peeling-off of the first adhesive layer on this side due to multi-axial stresses in the bent state, and to reduce adverse effects that the bending stress has on flexible electronic device. In addition, in this embodiment, the flexible auxiliary layer 150 is disposed on the outer surface of the first protection film 120 as an example. The flexible auxiliary layer 150 may also be attached to the outer surface of the substrate 110 in the package region 102 or at other suitable positions according to the actual needs, so as to reduce the stress value suffered by components that have lower flexibility limits or layers that are on the neutral axis plane in the flexible electronic device 100 in the bent state.

As shown in FIG. 1D, the flexible auxiliary layer 150 on the bent section 106 is on the inner side of the flexible electronic device 100 in the bent state. That is, a radius of curvature of the flexible auxiliary layer 150 may be smaller than a radius of curvature of the substrate 110. In this bent state, the flexible electronic device 100 provided with the flexible auxiliary layer 150 has the tensile stress zone T', the compressive stress zone C', and the neutral axis plane N' between the compressive stress zone C' and the tensile stress zone T' in the bent section 106 due to the bending stress. With the flexible auxiliary layer 150, the position of the neutral axis plane N' defined by the bending stress is shifted toward the flexible auxiliary layer 150. Therefore, the neutral axis plane N' is closer to the first protection film 120, as compared with the neutral axis plane N in the case of the flexible electronic device without the flexible auxiliary layer 150. The first adhesive layer 130 in the bent section 106 is on the neutral axis plane N' so the first adhesive layer 130 has the lowest stress value in the bent state, so as to prevent the first adhesive layer 130 from having creep and peeling off, which may easily occur if it is located in the compressive stress zone C'.

Here it should be noted that, in this embodiment, a thickness of the flexible auxiliary layer 150 may be substantially equal to the thickness of the display medium layer 140, but not limited thereto. In alternative embodiments, the thickness of the flexible auxiliary layer 150 may be adjusted according to the Young's modulus of the material or other material properties to meet the actual design needs. For example, when the thickness of the flexible auxiliary layer disposed on the outer surface of the first protection film increases, the neutral axis plane shifts to a greater extent toward the flexible auxiliary layer and the first adhesive layer is located in the tensile stress zone. Accordingly, creep of the first adhesive layer due to multi-axial stresses may be prevented. Moreover, the thickness of the flexible auxiliary layer 150 may also be adjusted according to physical parameters such as the stress values of different selected materials, and thus is not limited to the above. For example, the Young's modulus of the flexible auxiliary layer 150 of this embodiment may be greater than 1500 MPa. It should be noted that the position of the flexible auxiliary layer 150 may be adjusted according to the actual needs. The scope of the invention covers any case where the most fragile material of the package region 102 falls on the neutral axis plane N' or in the tensile stress zone T' to defer creep or separation of the components or layers formed of the soft material due to bending, and thus is not limited to the above.

In this embodiment, the flexible auxiliary layer 150 of the flexible electronic device 100 includes a second adhesive layer 152 and a flexible material layer 154, wherein the second adhesive layer 152 is located between the flexible material layer 154 and the first protection film 120, and the flexible material layer 154 is bonded to the first protection film 120 via the second adhesive layer 152. Here, a material of the second adhesive layer 152 may be an adhesive material such as OCA, and the flexible material layer 154 may be a soft and/or flexible material such as PET, for example, but not limited thereto.

Referring to FIG. 1A, in this embodiment, the flexible auxiliary layer 150 may include two auxiliary patterns 156A and 156B that are opposite to each other. The two auxiliary patterns 156A and 156B may be respectively disposed on two opposite sides of the flexible electronic device 100, and the two auxiliary patterns 156A and 156B respectively extend along the corresponding sides, so as to define a predetermined bent section 108 of the flexible electronic device 100.

Specifically, the two auxiliary patterns 156A and 156B of this embodiment are disposed correspondingly in the package region 102 with respect to the display region 104, extend along the X axis, and are located on two opposite sides of the display region 104, and a length of each of the two auxiliary patterns 156A and 156B is smaller than a length of the corresponding side of the flexible electronic device 100. Here, the lengths of the two auxiliary patterns 156A and 156B in the X-axis direction are substantially equal to each other, such that the flexible electronic device 100 has the predetermined bent section 108 defined by connection lines of two ends of the two auxiliary patterns 156A and 156B, and the flexible electronic device 100 may be bent in the predetermined bent section 108.

The predetermined bent section 108 defined by the two auxiliary patterns 156A and 156B in FIG. 1A is substantially the bent section 106 in FIG. 1D. According to the above, the two auxiliary patterns 156A and 156B may adjust the position of the neutral axis plane N' of the bent section 106 when the flexible electronic device 100 is in the bent state, so as to help prevent creep of the first adhesive layer 130. In other words, the stress suffered by the first adhesive layer 130 in the package region 102 when it is bent may be effectively reduced to prevent damage simply by attaching the flexible auxiliary layer 150 of this embodiment to the predetermined bent section 108. However, in other embodiments, the disposition and the configuration of the flexible auxiliary layer 150 is not limited to the above. For example, if the product design involves more than one predetermined bent section 108, the flexible auxiliary layer 150 may include more auxiliary patterns disposed correspond to the predetermined bent sections 108, or completely cover the package region 102 and surround the entire display region 104, such that the flexible electronic device 100 may be fully or arbitrarily twisted, bent, or curled.

In addition, the flexible electronic device 100 of this embodiment further includes a second protection film 160. The substrate 110 is disposed between the first protection film 120 and the second protection film 160. That is, the second protection film 160 is disposed on the side of the substrate 110 to be opposite to the first protection film 120 for protecting the substrate 110. The material, assembly, and function of the second protection film 160 are similar to those of the first protection film 120. Details thereof have been specified in the previous embodiment and thus are not repeated hereinafter. Here, the second protection film 160 and the substrate 110 may be bonded to each other via a third adhesive layer (not shown), and the material of the third adhesive layer may be similar to that of the first adhesive layer 130 or the second adhesive layer 152 described above and thus is not repeated hereinafter. Moreover, in this embodiment, the flexible auxiliary layer 150 is disposed on the outer surface of the first protection film 120 as an example. The flexible auxiliary layer 150 may also be attached to the outer surface of the second protection film 160 to meet the actual design needs.

It should be mentioned that reference numerals and some descriptions provided in the previous embodiment are also applied to the following embodiment. The same reference numerals are presented to denote identical or similar components in the embodiments, and repetitive descriptions are omitted. The omitted descriptions may be found in the previous embodiments, and thus are not repeated hereinafter.

Figure 1E:
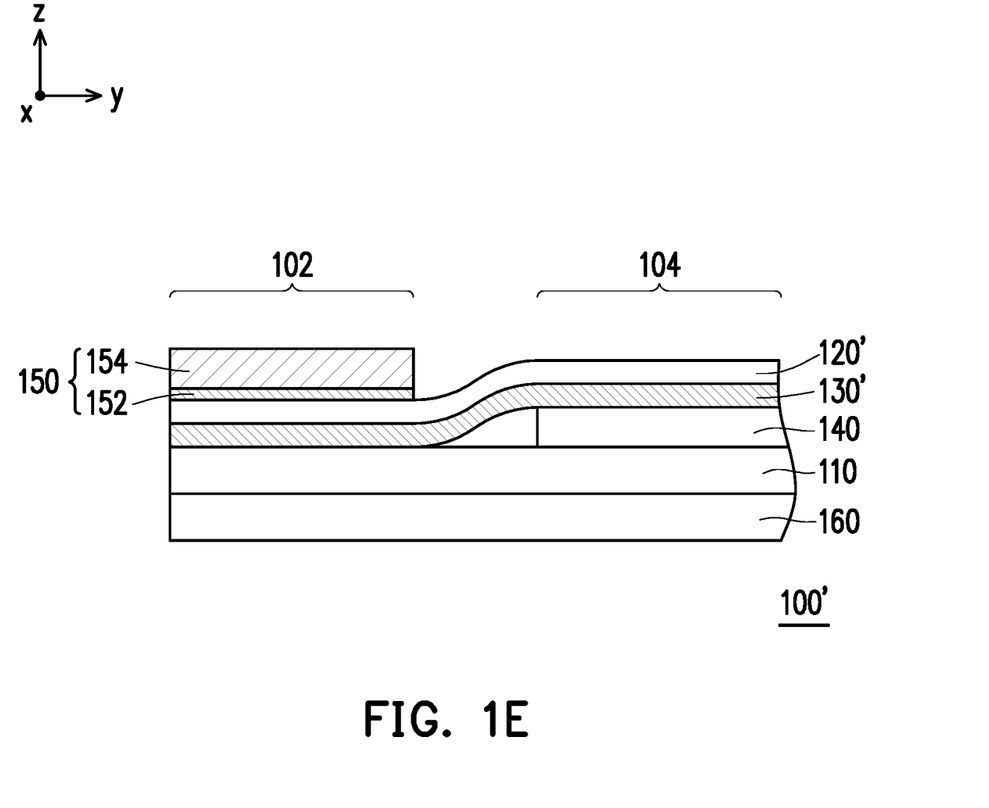
FIG. 1E is a schematic cross-sectional view of another flexible electronic device according to an embodiment of the invention.

FIG. 1E is a schematic cross-sectional view of another flexible electronic device according to an embodiment of the invention. Referring to FIG. 1B and FIG. 1E, the flexible electronic device 100' of this embodiment is similar to the flexible electronic device 100 of FIG. 1B, and thus identical or similar components are denoted by the same or similar reference numerals. Specifically, the flexible electronic device 100' has a display region 104 and a package region 102 surrounding the display region 104. The flexible electronic device 100' includes a substrate 110, a first protection film 120', a first adhesive layer 130', a display medium layer 140, a flexible auxiliary layer 150, and a second protection film 160, wherein the configuration and functions of the substrate 110, the display medium layer 140, the flexible auxiliary layer 150, and the second protection film 160 and the functions of the first protection film 120' and the first adhesive layer 130' have been specified in the embodiment of FIG. 1B and thus are not repeated hereinafter. A difference between the flexible electronic device 100' and the flexible electronic device 100 is that: the first adhesive layer 130' of this embodiment extends continuously in the package region 102 and the display region 104.

Specifically, the first adhesive layer 130' of this embodiment is disposed on the entire inner surface of the first protection film 120'. That is, the first adhesive layer 130' is located between the first protection film 120' and the substrate 110 in the package region 102, and is located between the first protection film 120' and the display medium layer 140 in the display region 104 as well. That is, in this embodiment, the orthographic projection area of the first adhesive layer 130' on the substrate 110 completely overlaps the orthographic projection area of the first protection film 120' on the substrate 110. Here, the scope of the invention covers any case where the first adhesive layer 130' is sufficient to provide the bonding strength between the substrate 110 and the first protection film 120', and thus is not limited to the above.

Figure 2A:
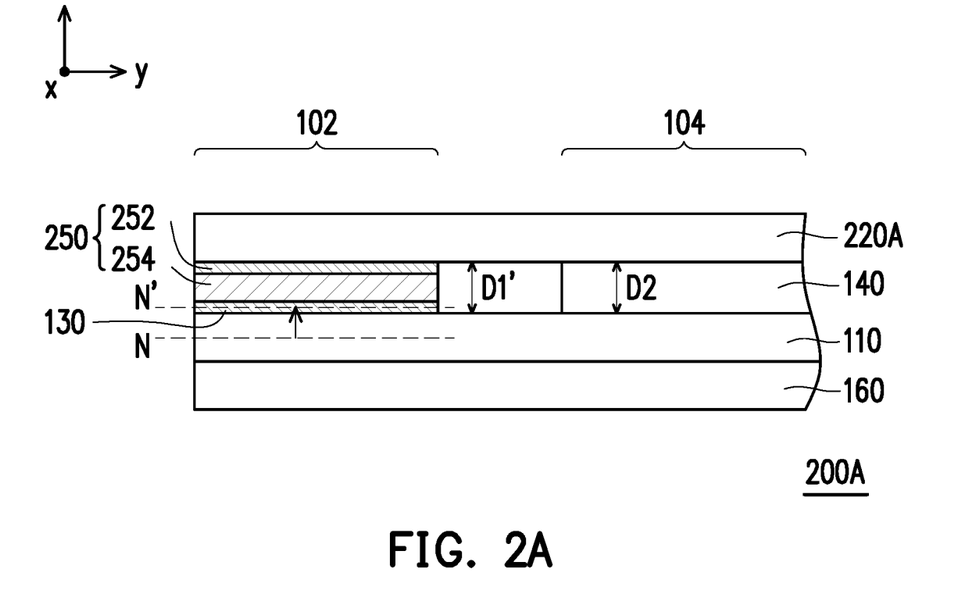
FIG. 2A to FIG. 2B are schematic cross-sectional views of a flexible electronic device along the Y-axis direction according to another embodiment of the invention.

FIG. 2A is a schematic cross-sectional view of a flexible electronic device along the Y-axis direction according to another embodiment of the invention. Referring to FIG. 1B and FIG. 2A, the flexible electronic device 200A of this embodiment is similar to the flexible electronic device 100 of FIG. 1B, and thus identical or similar components are denoted by the same or similar reference numerals. Specifically, the flexible electronic device 200A has a display region 104 and a package region 102 surrounding the display region 104. The flexible electronic device 200A includes a substrate 110, a first protection film 220A, a first adhesive layer 130, a display medium layer 140, a flexible auxiliary layer 250, and a second protection film 160, wherein the configuration and functions of the substrate 110, the first adhesive layer 130, the display medium layer 140, and the second protection film 160 and the functions of the flexible auxiliary layer 250 and the first protection film 220A have been specified in the embodiment of FIG. 1B and thus are not repeated hereinafter.

In this embodiment, the flexible auxiliary layer 150 is disposed on the inner surface of the first protection film 200A in the package region 102. That is, the flexible auxiliary layer 250 is located between the first protection film 220A and the substrate 110 in the package region 102. Here, a flexible material layer 254 of the flexible auxiliary layer 250 is attached to the inner surface of the first protection film 220A in the package region 102 via a second adhesive layer 252, and the first adhesive layer 130 bonds the flexible material layer 254 of the flexible auxiliary layer 250 and the substrate 110 in the package region 102. In other words, the flexible material layer 254 bonds to the substrate 110 and the first protection film 220A respectively via the first adhesive layer 130 and the second adhesive layer 252 and is located between the substrate 110 and the first protection film 220A.

The thickness of the flexible auxiliary layer 250 is substantially equal to the thickness of the display medium layer 140, such that a first distance D1' between the substrate 110 and the first protection film 220A in the package region 102 is substantially equal to a second distance D2 between the substrate 110 and the first protection film 220A in the display region 104. That is, the first protection film 220A extends substantially flatly between the display region 104 and the package region 102. In this case, since the difference between the first distance D1' and the second distance D2 causes a smaller stress in the first adhesive layer 130, creep or peeling-off of the first adhesive layer 130 does not easily occur when the flexible electronic device 200A is bent.

Figure 2B:
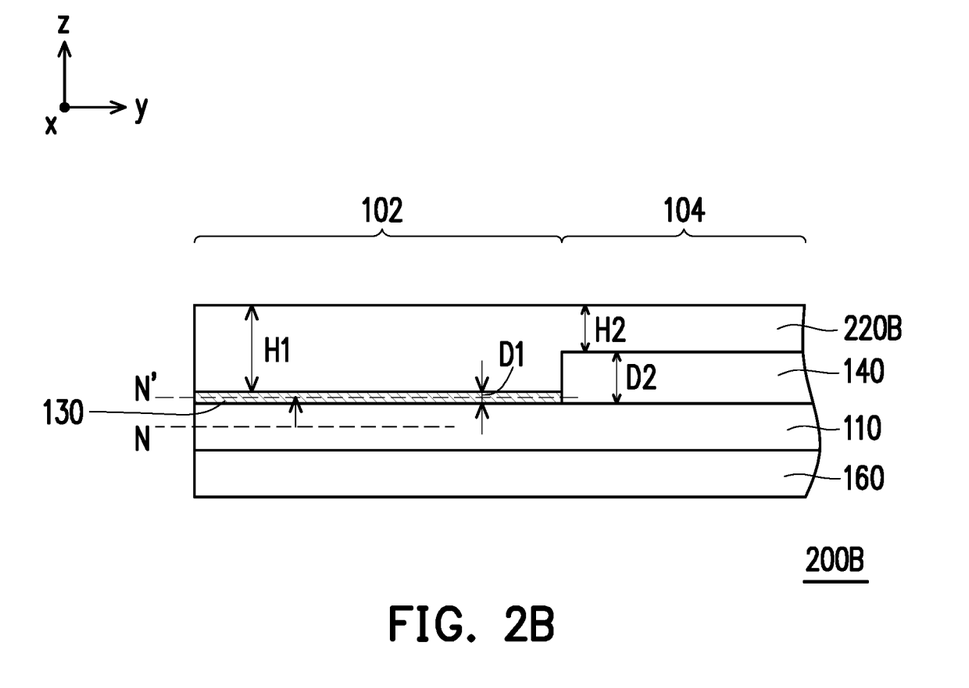

FIG. 2B is a schematic cross-sectional view of a flexible electronic device along the Y-axis direction according to another embodiment of the invention. Referring to FIG. 1B and FIG. 2B, the flexible electronic device 200B of this embodiment is similar to the flexible electronic device 100 of FIG. 1B, and thus identical or similar components are denoted by the same or similar reference numerals. Specifically, the flexible electronic device 200B has a display region 104 and a package region 102 surrounding the display region 104. The flexible electronic device 200B includes a substrate 110, a first protection film 220B, a first adhesive layer 130, a display medium layer 140, and a second protection film 160, wherein the configuration and functions of the substrate 110, the first adhesive layer 130, the display medium layer 140, and the second protection film 160 and the functions of the first protection film 220B have been specified in the embodiment of FIG. 1B and thus are not repeated hereinafter. A difference between the flexible electronic device 200B and the flexible electronic device 100 is that: the first protection film 220B of this embodiment has a first thickness H1 in the package region 102 and a second thickness H2 in the display region 104, wherein the first thickness H1 is greater than the second thickness H2, so as to prevent separation between the substrate 110 and the first protection film 220B caused by peeling-off of the first adhesive layer 130 between the substrate 110 and the first protection film 220B in the package region 102.

Specifically, the first thickness H1 of the first protection film 220B in the package region 102 is greater than the second thickness H2 of the first protection film 220B in the display region 104, and a total of the first thickness H1 and the first distance D1 is approximately equal to a total of the second thickness H2 and the second distance D2, such that a plane of the outer surface of the first protection film 220B is substantially parallel to the substrate 110. In this case, since the first protection film 220B extends substantially flatly between the display region 104 and the package region 102, creep or peeling-off of the first adhesive layer 130 does not easily occur when the flexible electronic device 200B is bent. That is, the first protection film 220B of this embodiment also has the function of the flexible auxiliary layer 150 of FIG. 1B. It should also be noted that the first adhesive layer 130 of this embodiment may also extend between the package region 102 and the display region 104 like the first adhesive layer 130' shown in FIG. 2A, or the position thereof may be adjusted according to the actual design and thus is not particularly limited.

Figure 3:
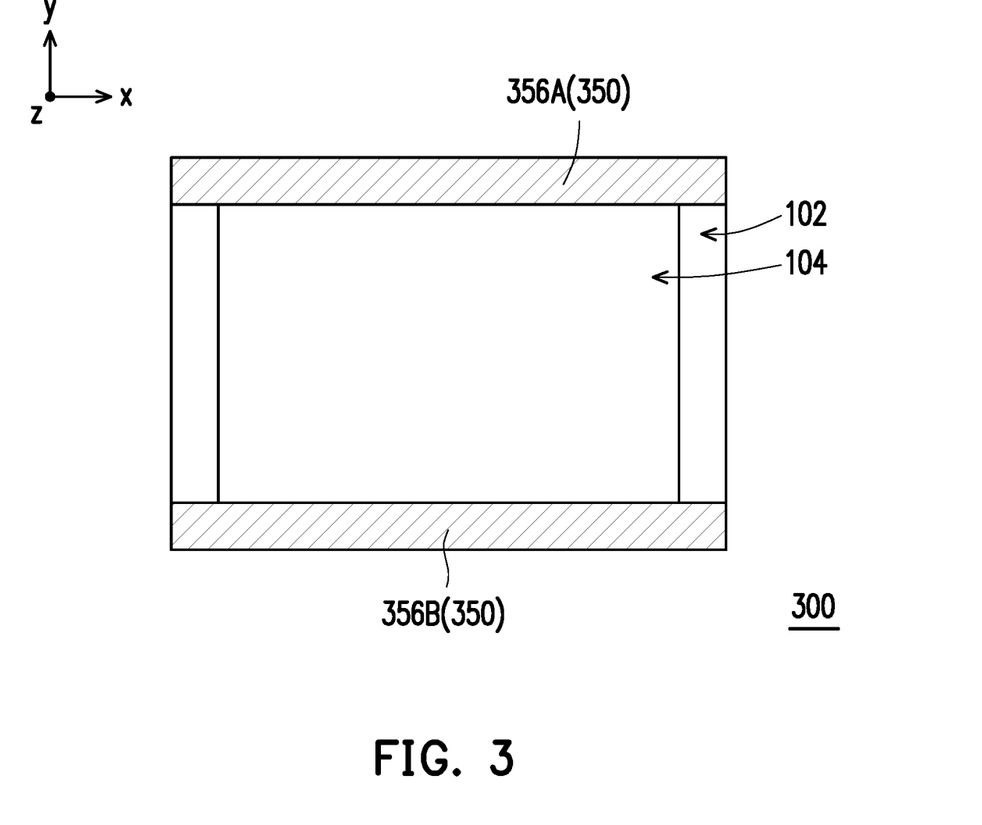
FIG. 3 to FIG. 5 are schematic top views of flexible electronic devices according to different embodiments of the invention.

FIG. 3 is a schematic top view of a flexible electronic device according to another embodiment of the invention. Referring to FIG. 1A and FIG. 3, the flexible electronic device 300 of this embodiment is similar to the flexible electronic device 100 of FIG. 1A, and thus identical or similar components are denoted by the same or similar reference numerals. Specifically, the cross-sectional structure of the flexible electronic device 300 may be understood with reference to FIG. 1B or FIG. 2A. The function of a flexible auxiliary layer 350 is similar to that of the flexible auxiliary layer 150 of FIG. 1B or the flexible auxiliary layer 250 of FIG. 2A, which is for adjusting the position of the neutral axis plane (not shown) in the bent state or reducing the stress applied on the first adhesive layer. A difference between the flexible electronic device 300 and the flexible electronic device 100 is that: the flexible auxiliary layer 350 in the package region 102 of the flexible electronic device 300 of this embodiment includes two auxiliary patterns 356A and 356B. The two auxiliary patterns 356A and 356B are longer in the X-axis direction than the two auxiliary patterns 156A and 156B of the flexible auxiliary layer 150 of FIG. 1A. For example, the lengths of the two auxiliary patterns 356A and 356B in the X-axis direction may be substantially equal to the length of the flexible electronic device 300 in the X-axis direction. In other words, the two auxiliary patterns 356A and 356B are attached to the package region 102 along two opposite sides of the flexible electronic device 300 that extend along the X-axis direction, such that the flexible electronic device 300 may be arbitrarily bent, flexed, or curled in the region where the auxiliary patterns 356A and 356B are disposed, and creep or peeling-off of the adhesive layer does not occur easily.

Figure 4:
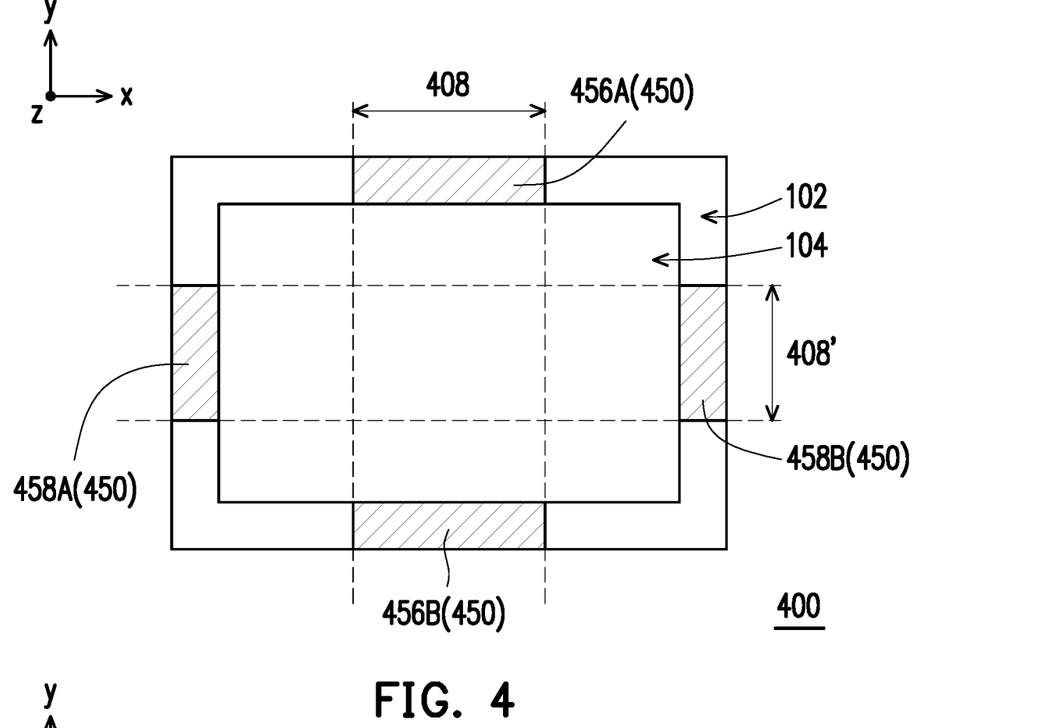

FIG. 4 is a schematic top view of a flexible electronic device according to another embodiment of the invention. Referring to FIG. 1A and FIG. 4, the flexible electronic device 400 of this embodiment is similar to the flexible electronic device 100 of FIG. 1A, and thus identical or similar components are denoted by the same or similar reference numerals. The cross-sectional structure of the flexible electronic device 400 may be understood with reference to FIG. 1B or FIG. 2A. The function of a flexible auxiliary layer 450 is similar to that of the flexible auxiliary layer 150 of FIG. 1B or the flexible auxiliary layer 250 of FIG. 2A, which is for adjusting the position of the neutral axis plane (not shown) in the bent state or reducing the stress applied on the first adhesive layer. A difference between the flexible electronic device 400 and the flexible electronic device 100 is that: in addition to two auxiliary patterns 456A and 456B which are similar to the two auxiliary patterns 156A and 156B of the flexible auxiliary layer 150 of the flexible electronic device 100, the flexible auxiliary layer 450 of the flexible electronic device 400 of this embodiment further includes two auxiliary patterns 458A and 458B that are parallel to and opposite to each other.

Specifically, the two auxiliary patterns 458A and 458B are disposed in the package region 102 on two opposite sides (the sides parallel to the Y direction) of the flexible electronic device 400, while the two auxiliary patterns 456A and 456B are disposed in the package region 102 on the other two opposite sides (the sides parallel to the X direction) of the flexible electronic device 400. Here, a length of each of the two auxiliary patterns 458A and 458B is smaller than a length of the corresponding side in the Y direction, and the two auxiliary patterns 458A and 458B are parallel to each other in the Y-axis direction and have substantially equal lengths, such that a predetermined bent section 408' of the flexible electronic device 400 is defined by connection lines, which are parallel to the X axis, of two ends of the two auxiliary patterns 458A and 458B.

Moreover, the configuration and functions of the two auxiliary patterns 456A and 456B of this embodiment are the same as those of the two auxiliary patterns 156A and 156B shown in FIG. 1A. The predetermined bent section 408 of the flexible electronic device 400 is defined by the connection lines, which are parallel to the X axis, of two ends of the two auxiliary patterns 458A and 458B. Nevertheless, in this embodiment, two groups of auxiliary patterns 456A and 456B and auxiliary patterns 458A and 458B are disposed on the sides of the flexible electronic device 400 as an example. In alternative embodiments not shown here, the flexible auxiliary layer may include a plurality of auxiliary patterns disposed on the corresponding one side to define a plurality of predetermined bent sections according to the actual design needs.

Figure 5:
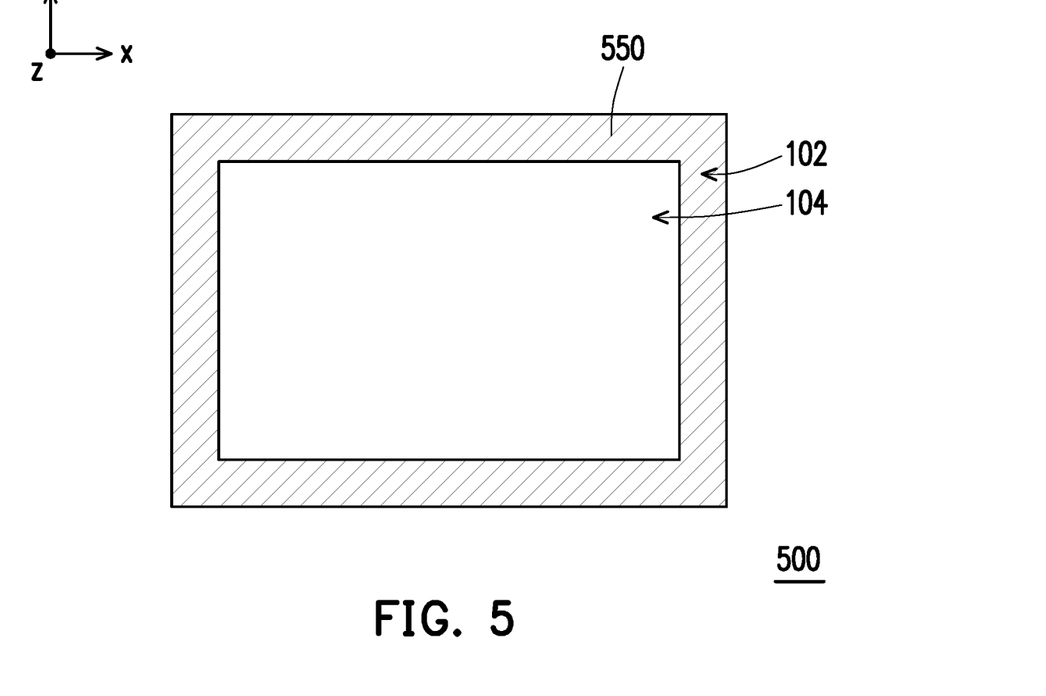

FIG. 5 is a schematic top view of a flexible electronic device according to another embodiment of the invention. Referring to FIG. 3 and FIG. 5, the flexible electronic device 500 of this embodiment is similar to the flexible electronic device 300 of FIG. 3, and thus identical or similar components are denoted by the same or similar reference numerals. A difference between the flexible electronic device 500 and the flexible electronic device 300 is that: a flexible auxiliary layer 550 of the flexible electronic device 500 of this embodiment constitutes a closed frame pattern to comprehensively surround the display region 104 and completely correspond to the package region 102.

Specifically, the cross-sectional structure of the flexible electronic device 500 may be understood with reference to FIG. 1B or FIG. 2A. The function of a flexible auxiliary layer 550 is similar to that of the flexible auxiliary layer 150 of FIG. 1B or the flexible auxiliary layer 250 of FIG. 2A, which is for adjusting the position of the neutral axis plane (not shown) in the bent state or reducing the stress applied on the first adhesive layer. Accordingly, no matter the flexible electronic device 500 is bent, flexed, twisted, or curled, the flexible auxiliary layer 550 helps to put the first adhesive layer in the package region 102 on the neutral axis plane or in the tensile stress zone (not shown), so as to prevent creep and peeling-off of the first adhesive layer due to multi-axial stresses.

To sum up, the flexible electronic device according to one or some embodiments of the invention includes the flexible auxiliary layer located within the package region for adjusting the position of the neutral axis plane or reducing the stress received by the first adhesive layer when the package region is in the bent state. Thus, peeling-off of the first adhesive layer between the substrate and the first protection film in the package region, which results from the bending stress, is effectively prevented to avoid damaging the flexible electronic device when it is bent during intense use, and thereby increasing the service life of the flexible electronic device.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A flexible electronic device, having a display region and a package region surrounding the display region, the flexible electronic device comprising:
    a substrate;
    a first protection film disposed opposite to the substrate;
    a first adhesive layer disposed between the substrate and the first protection film and located within the package region;
    a display medium layer disposed between the substrate and the first protection film and located within the display region; and
    a flexible auxiliary layer disposed on a surface of the first protection film and located within the package region, wherein the flexible auxiliary layer overlaps the first adhesive layer in a thickness direction,
    wherein a first distance exists between the substrate and the first protection film in the package region, and a second distance exists between the substrate and the first protection film in the display region, and the first distance is smaller than the second distance.

2. The flexible electronic device according to claim 1, wherein the first protection film is bonded to the substrate via the first adhesive layer.

3. The flexible electronic device according to claim 1, wherein the first protection film is located between the flexible auxiliary layer and the substrate.

4. The flexible electronic device according to claim 3, wherein in a bent state, a bent section of the flexible electronic device has a compressive stress zone, a tensile stress zone, and a neutral axis plane between the compressive stress zone and the tensile stress zone, and the first adhesive layer in the bent section is located in the tensile stress zone or on the neutral axis plane.

5. The flexible electronic device according to claim 1, wherein the flexible auxiliary layer is located between the first protection film and the substrate.

6. The flexible electronic device according to claim 5, wherein a third distance exists between the substrate and the first protection film in the package region, and a fourth distance exists between the substrate and the first protection film in the display region, and the third distance and the fourth distance are equal.

7. The flexible electronic device according to claim 1, wherein the flexible auxiliary layer and the first adhesive layer both surround the display region.

8. The flexible electronic device according to claim 1, wherein the flexible auxiliary layer comprises two auxiliary patterns opposite to each other, and the two auxiliary patterns are respectively disposed on two opposite sides of the flexible electronic device, and each of the two auxiliary patterns extends along a corresponding side to define a predetermined bent section of the flexible electronic device.

9. The flexible electronic device according to claim 8, wherein a length of each of the two auxiliary patterns is smaller than a length of the corresponding side.

10. The flexible electronic device according to claim 1, wherein a Young's modulus of the flexible auxiliary layer is greater than 1500 MPa.

11. The flexible electronic device according to claim 1, wherein the flexible auxiliary layer comprises a second adhesive layer and a flexible material layer, and the second adhesive layer is located between the flexible material layer and the first protection film, and the flexible material layer is bonded to the first protection film via the second adhesive layer.

12. The flexible electronic device according to claim 1, further comprising:
    a second protection film, wherein the substrate is disposed between the first protection film and the second protection film.

13. The flexible electronic device according to claim 1, wherein the flexible auxiliary layer surrounds the display region, and the first adhesive layer extends continuously in the package region and the display region.

14. A flexible electronic device, having a display region and a package region surrounding the display region, the flexible electronic device comprising:
    a substrate;
    a first protection film disposed opposite to the substrate, wherein the first protection film has a first thickness in the package region and a second thickness in the display region, and the first thickness is greater than the second thickness;
    a first adhesive layer disposed between the substrate and the first protection film and located within the package region; and
    a display medium layer disposed between the substrate and the first protection film and located within the display region.

15. The flexible electronic device according to claim 14, wherein the first protection film is bonded to the substrate via the first adhesive layer.

16. The flexible electronic device according to claim 14, wherein a first distance exists between the substrate and the first protection film in the package region, and a second distance exists between the substrate and the first protection film in the display region, and the first distance is smaller than the second distance.

17. The flexible electronic device according to claim 16, wherein a total of the first distance and the first thickness is equal to a total of the second distance and the second thickness.

18. The flexible electronic device according to claim 14, further comprising:
    a second protection film, wherein the substrate is disposed between the first protection film and the second protection film.

* * * * *